United States Patent [19]
Carnicelli et al.

[11] Patent Number: 6,016,709
[45] Date of Patent: Jan. 25, 2000

[54] PRESSURE SENSITIVE OPTICAL DEVICE AND PRESENCE DETECTION FLOOR

[75] Inventors: Vito Carnicelli, Seyssinet-Pariset; Dominique Godfroy, Grenoble; Marek Gierczak, Meylan, all of France

[73] Assignee: Honeywell Inc., Minneapolis, Minn.

[21] Appl. No.: 08/945,127

[22] PCT Filed: Mar. 22, 1996

[86] PCT No.: PCT/FR96/00436

§ 371 Date: Dec. 16, 1997

§ 102(e) Date: Dec. 16, 1997

[87] PCT Pub. No.: WO96/34262

PCT Pub. Date: Oct. 31, 1996

[51] Int. Cl.[7] .................................................. G01L 1/24
[52] U.S. Cl. ............................................................ 73/800
[58] Field of Search .......................... 73/800, 762, 774, 73/776, 794

[56] References Cited

U.S. PATENT DOCUMENTS

| | | | |
|---|---|---|---|
| 4,781,056 | 11/1988 | Noel et al. | 73/800 |
| 4,836,030 | 6/1989 | Martin | 73/800 |
| 4,947,693 | 8/1990 | Szuchy et al. | 73/800 |
| 5,029,977 | 7/1991 | Wheeler et al. | 73/800 |
| 5,309,767 | 5/1994 | Parmar et al. | 73/800 |
| 5,357,813 | 10/1994 | Weinberger | 73/800 |

*Primary Examiner*—Max Noori
*Attorney, Agent, or Firm*—Kris T. Fredrick

[57] ABSTRACT

It comprises a series of measurement optical fiber (2) segments (2a, 2b, 2c) and a series of stress fiber (3) segments (3a, 3b) extending transversely to a longitudinal direction of the measurement optical fiber segments, the stress fiber segments being disposed in alternation on opposite sides of the measurement optical fiber segments, the fiber segments of at least one series being covered by a protective member (4) enabling the covered fiber segments to move relative to the protective member.

28 Claims, 1 Drawing Sheet

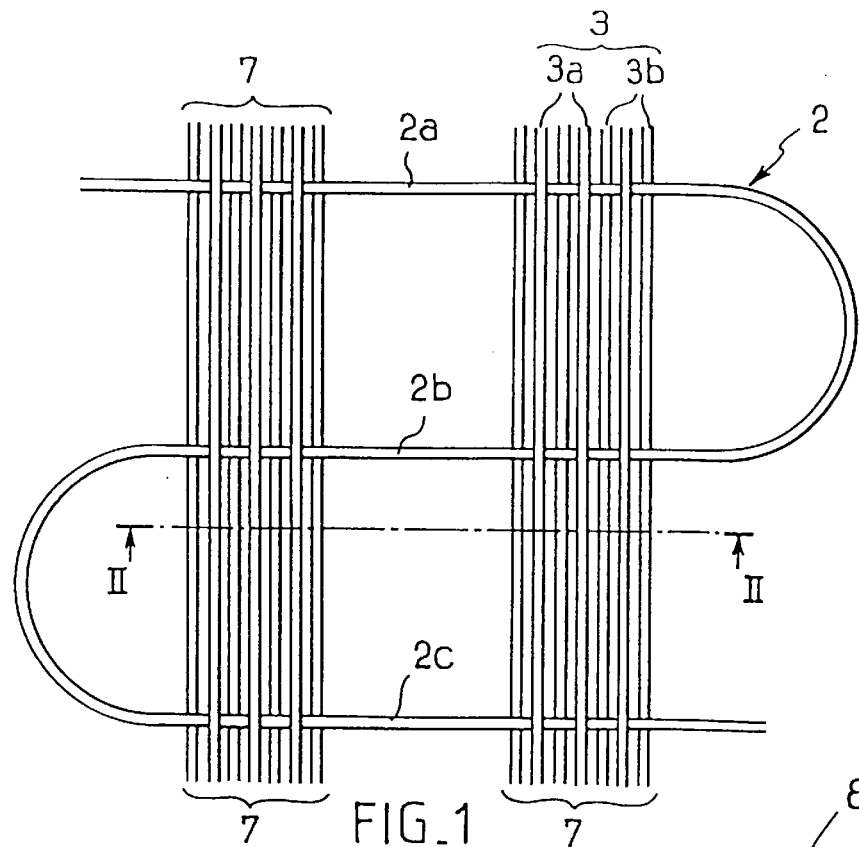
FIG_1
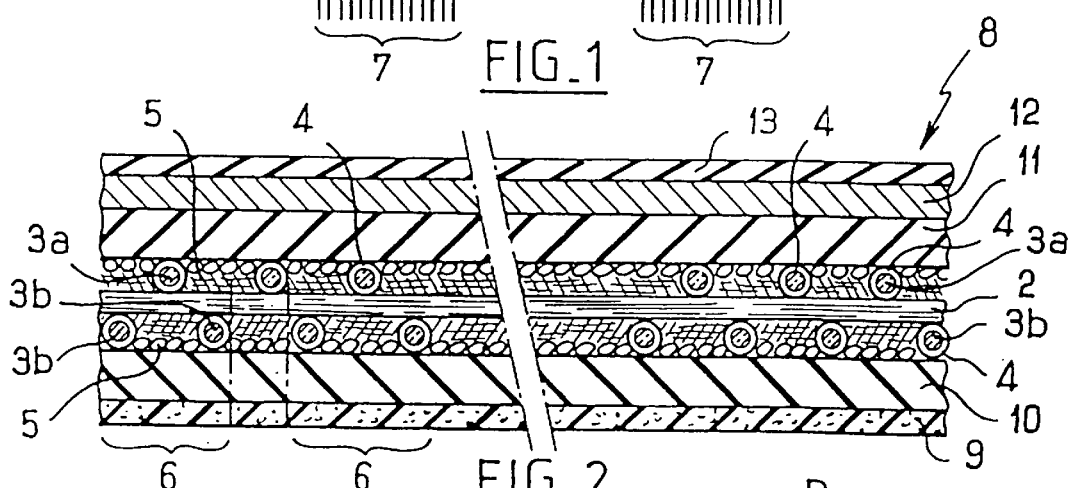
FIG_2
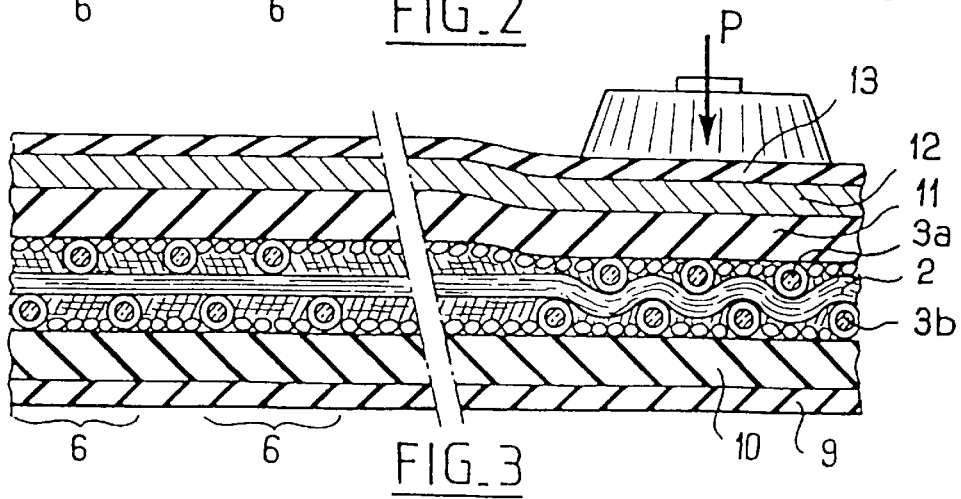
FIG_3

PRESSURE SENSITIVE OPTICAL DEVICE AND PRESENCE DETECTION FLOOR

The present invention relates to a pressure-sensitive optical device and to a presence-detection floor including the optical device.

Optical devices are known that serve to measure a pressure by sensing the attenuation in the intensity of light transmitted by an optical fiber, said attenuation being caused by the fiber deforming when it is subjected to a force.

In particular, document FR-A-2 578 645 discloses a pressure-sensitive optical cloth in which deformation of the measurement optical fiber is induced by external elements constituted by fibers disposed perpendicularly to the measurement fiber and on opposite sides thereof. Also, document EP-A-419 267 discloses a pressure-sensitive optical device in which the deformation of the optical fiber is induced by rigid external elements, e.g. layers or plates that are corrugated or of sawtooth shape.

Those devices suffer from the major drawback of giving rise to permanent friction of the external elements against the surface of the fiber. That leads rapidly to the surface of the fiber being spoilt, which gives rise to permanent modification of the light signal transmitted by the fiber, and even to the fiber breaking.

For devices that are used for safety or security purposes, e.g. to detect the presence of an employee in a dangerous zone, or the presence of an intruder in a building, the light signal transmitted to the sensor after passing along the fiber must be reproducible, in order to avoid triggering false alarms while also being certain to respond under the intended conditions.

In order to mitigate the above-mentioned drawbacks, the invention proposes a pressure-sensitive device comprising a series of measurement optical fiber segments and a series of stress members, such that stress fiber segments extend transversely to a longitudinal direction of the measurement optical fiber segments, the stress members being disposed alternately on opposite sides of the measurement optical fiber segments, and in which the measurement optical fiber segments and/or the stress fiber segments are covered in a protective member disposed to allow the fiber segments it covers to move relative to the protective member.

Thus, the force applied to the stress members and transmitted to the measurement optical fiber is spread by the protective member so that dry friction between the measurement optical fiber segments and the stress members is softened and the wear zone is enlarged, thereby minimizing wear of the measurement optical fiber, and where appropriate of the stress fiber segments, and considerably increasing the lifetime of the pressure-sensitive device. In addition, the fiber segments are also protected during manufacture of the device.

In an advantageous version of the invention, the protective member is constituted by at least one thread that is helically wound, braided, knitted, or woven. This provides a sheath that is easily deformable and that has sufficient freedom of movement.

Preferably, the sheath is then made with a thread of material that is softer than the fiber which it protects. Thus, the wear which results from friction applies mainly to the sheath, thereby correspondingly extending the lifetime of the measurement optical fiber.

According to an advantageous feature of the invention, the sheath is made with a thread that is small in diameter compared with the diameter of the fibers it covers. This minimizes the increase in the diameter of the fiber segments and consequently the bending stresses to which the measurement optical fiber is subjected when the device is subjected to pressure.

According to another advantageous feature of the invention, the measurement optical fiber is a silica fiber and the stress fiber is made of synthetic material. This provides a good compromise between performance and cost.

In another aspect, the invention provides a presence-detection floor including a pressure-sensitive device of the invention disposed between a top layer of resilient material and a bottom layer of resilient material, a flexible metal sheet being disposed above the top layer of resilient material. While ensuring that the floor retains a sensitivity threshold that is satisfactory, this avoids the pressure-sensitive device being subjected to a direct force that would run the risk of causing it to wear prematurely.

Other characteristics and advantages of the invention appear on reading the following description of a particular non-limiting embodiment of the invention, given with reference to the accompanying drawing in which:

FIG. 1 is a diagrammatic plan view of the cloth of the invention without backing cloth;

FIG. 2 is an enlarged section view on line II—II of FIG. 1, through a detection floor fitted with a pressure-sensitive cloth of the invention, shown at rest; and FIG. 3 is a view analogous to FIG. 2 showing a detection floor subjected to a load.

With reference to FIG. 1, the pressure-sensitive optical cloth of the invention comprises a measurement optical fiber given overall reference 2 which is disposed along a meandering path comprising a series of parallel rectilinear measurement optical fiber segments 2a, 2b, and 2c. Perpendicularly to the measurement optical fiber segments, the pressure-sensitive optical cloth has stress fiber segments given overall reference 3 which are disposed alternately on opposite sides of the measurement optical fiber segments 2. To identify the stress fiber segments better, segments disposed above the measurement optical fiber 2 are given numerical reference 3a while segments disposed below the measurement optical fiber are given numerical reference 3b.

The spacing between the rectilinear segments of the measurement optical fiber must be sufficient to avoid the bends in the measurement optical fiber between its rectilinear segments giving rise to light signal losses. In practice, a distance of about 50 mm has been found to be very satisfactory. Also, in order to ensure that the light signal in the measurement optical fiber is attenuated in satisfactory manner when a force is applied to the stress fiber segments, these segments are disposed in a manner that is known per se at a pitch which is equal to an integer multiple of the light propagation half-wavelength in the fiber in use. In practice, a pitch of about 3.5 mm has been found to be very satisfactory.

In the embodiment shown, the measurement optical fiber segments and the stress fiber segments are made using the same graded index optical fiber made of doped silicon/silica/acrylate with a methyacrylate covering, having dimensions 50 $\mu$m/125 $\mu$m/250 $\mu$m, and a numerical aperture of 0.2. According to the invention, the fiber segments are covered by a protective member disposed to allow the covered fiber segments to move relative to the protective member. In the particular embodiment shown, the protective member is constituted by a sheath 4 made up of multiple filaments of polyamide having a diameter close to 50 $\mu$m and wound helically around the fiber segments to cover them.

To ensure that the measurement optical fiber segments 2 and the stress fiber segments 3 are maintained in the desired disposition, they are incorporated in a backing cloth 5, the stress fibers 3 being incorporated in the cloth as warp threads while the measurement optical fiber is incorporated in the backing cloth 5 in the form of weft threads.

A stress fiber segment 3a of the top layer co-operates with two stress fiber segments 3b of the bottom layer to constitute a stress node 6. When the pressure-sensitive mat is subjected to a load, the stress fiber 3a of a stress node tends to move to insert itself between the fibers 3b of the same node, thereby deforming the measurement optical fiber segment 2. Thus, a plurality of adjacent stress nodes 6 impart sinusoidal or pseudo-sinusoidal deformation to the measurement optical fiber 2 and it has been observed that the light attenuation caused by a load on three adjacent stress nodes is sufficient to be detected by means of simple electronic circuits.

In this context, it may be observed that a uniform distribution of stress fiber segments would lead to a similarly uniform distribution of the pressure applied on a large number of stress nodes such that the bending of the optical fiber would run the risk of being below a threshold required for causing perceptible attenuation of the light in the measurement optical fiber. According to a feature of the invention, provision is therefore made to place the stress fibers in mutually spaced apart groups 7 (FIG. 1). In practice, a group of stress fiber segments preferably comprises seven to eleven stress fiber segments, thereby implementing three to five adjacent stress nodes.

Two groups of stress fibers 7 are spaced apart by a distance that matches the intended use of the pressure-sensitive mat. For example, when the mat is intended to detect the presence of a person, the groups of stress fibers should be spaced apart at a distance that is smaller than the size of a foot so that it is not possible to place a foot on the pressure-sensitive mat without compressing at least one group of stress nodes. In practice, for stress fiber segments spaced apart at a pitch of about 3.5 mm, i.e. with a distance of 3.5 mm between the centers of two top stress fiber segments 3a or two bottom stress fiber segment 3b, a pattern of groups of stress fibers is used that repeats about every 50 mm.

The function of the backing cloth 5 is not only to hold the measurement optical fiber segments and the stress optical fiber segments in the desired relative positioning, but also to limit the amplitude of the deformation of the measurement optical fiber 2 by constituting an abutment for the measurement optical fiber 2 when the stress fibers move towards one another under the effect of an applied pressure. This avoids a stress fiber segment of the top layer penetrating completely between the stress fiber segments of the bottom layer, since that would give rise to excessive bending of the optical fiber 2 and would run the risk of breaking it.

The pressure-sensitive cloth of the invention is preferably used by being incorporated in a presence-detection floor 8, e.g. comprising a layer of closed-cell cellular foam 9 serving to insulate the floor 8 from the ground and to accommodate roughnesses and grit. A foam layer having a thickness of about 3 mm has been found satisfactory for this function.

Above the foam layer 9, the presence-detection floor includes two protective elastomer layers 10 and 11 of thickness lying in the range 1.5 mm to 2 mm with the pressure-sensitive cloth being sandwiched between them. A flexible metal sheet 12 is preferably disposed above the protective elastomer layer 11. The metal sheet 12 has a high elastic limit and serves to protect the pressure-sensitive mat by spreading the pressure of a load applied over too small an area on the pressure-sensitive mat. The metal sheet 12 is preferably covered with an elastomer covering 13 having a non-slip function, and serving to damp the shock from an accidentally dropped object.

One end of the measurement optical fiber 2 is connected in conventional manner to a source of light while its other end is connected to an electronic circuit for detecting light attenuation. It is also possible to place both the light source and the detection device at the same end of the measurement optical fiber 2 by using a light separator at this end and by placing a mirror at the opposite end of the measurement optical fiber 2 for the purpose of reflecting the emitted light. This disposition ensures that the light travels twice along the measurement optical fiber and therefore doubles the dynamic range of detection without giving rise to mode recombinations. The sensed losses are then twice as great, which enables the mat to be more reliable, thus making it particularly useful as a safety or security device. It is also possible to place a polarizer at the inlet to the measurement optical fiber and an analyzer at the outlet from the measurement optical fiber so that deformation is measured by a change in polarization within the measurement optical fiber.

Naturally, the invention is not limited to the embodiment described and it is possible to provide variant embodiments without going beyond the ambit of the invention as defined by the claims.

In particular, although the protective member 4 has been exemplified by a helically wound covering, it can equally well be constituted by a thread that is knitted, braided, or woven, or indeed by an extruded sheath having an inside diameter that is very slightly greater than the outside diameter of the covered fiber so as to allow the covered fiber segments to move relative to the protective member. Although the backing cloth has been exemplified by threads extending between the stress fiber segments, it is also possible to use a backing cloth in which the fibers cover the stress fibers.

Although the invention has been described with stress fiber segments of the same kind as the measurement optical fiber, and similarly covered, it is also possible to make the pressure-sensitive device of the invention by covering only one series of fiber segments, or by using stress fiber segments of a nature that is different from the measurement optical fiber. It is also possible to make a pressure-sensitive device by associating a measurement optical fiber with stress members of a different material, for example corrugated plates or plates including sawtooth ribs. Under such circumstances, it is the measurement optical fiber which is covered.

Although the measurement optical fiber 2 in the embodiment shown is continuous, with the rectilinear segments 2a, 2b, and 2c being united by curved portions, it is possible to provide a pressure-sensitive mat having a plurality of separate measurement optical fiber segments, each connected to a light source and to a detector device. It is also possible to provide for making a pressure-sensitive cloth in which the stress fiber segments are not exactly perpendicular to the measurement optical fiber segments, e.g. a cloth including a spiral measurement optical fiber and stress fiber segments disposed substantially radially.

Although the measurement optical fiber and the stress fiber in the embodiment described are both silica optical fibers giving very good results because of the low hysteresis of silica fiber, that kind of fiber is very expensive and a good compromise between cost and performance can be achieved by using a stress fiber made of synthetic material, e.g. fishing line.

We claim:

1. A pressure sensitive device comprising a series of measurement optical fiber segments and a series of stress fiber segments extending transversely to a longitudinal direction of the measurement optical fiber segments, the stress fiber segments being disposed in alternating manner on opposite sides of the measurement optical fiber segments, wherein the fiber segments in at least one of the series area covered by a protective member disposed to allow the covered fiber segments to move relative to the protective member, whereby the measurement optical fibers and the stress fibers are prevented from directly contacting each other thereby avoiding frictional degradation of the measurement optical fibers.

2. A pressure-sensitive device comprising a series of measurement optical fiber segments and a series of stress members extending transversely to a longitudinal direction of the measurement optical fiber segments, the stress members being disposed in alternating manner on opposite sides of the measurement optical fiber segments, wherein the measurement optical fiber segments are covered by a protective member disposed to allow the covered fiber segments to move relative to the protective member, whereby the measurement optical fibers and the stress fibers are prevented from directly contacting each other thereby avoiding frictional degradation of the measurement optical fibers.

3. A device according to claim 1, wherein the protective member is a tubular sheath; concentric with the covered fiber segments, and constituted by at least one thread that is helically wound, braided, knitted, or woven.

4. A pressure-sensitive device according to claim 3, characterized in that the fiber segments are made of methacrylate covered silica and the sheath is made of a thread of material that is softer than the fiber.

5. A pressure-sensitive device according to claim 3, characterized in that the sheath is made with a thread (4) of diameter that is small relative to the diameter of the fibers it covers.

6. A pressure-sensitive device according to claim 1, characterized in that the measurement optical fiber is made of silica and the stress fiber is made of synthetic material.

7. A pressure-sensitive device according to claim 1, wherein the stress fiber segments are disposed in groups that are spaced apart from one another.

8. A pressure-sensitive device according to claim 2, characterized in that the series of fiber segments (2, 3) are maintained in a predetermined relative position by a backing cloth (5).

9. A pressure-sensitive device according to claim 8, characterized in that the backing cloth (5) comprises fibers extending in a layer between the stress fibers (3).

10. A presence-detection floor comprising a device according to any one of claims 1 to 9, characterized in that it comprises top and bottom layers (11, 10) of resilient material sandwiching the pressure-sensitive device, and a flexible metal sheet (12) disposed above the top layer (11) of resilient material.

11. A device according to claim 2 wherein;
the protective member is a tubular sheath concentric with the covered fiber segments and constituted by at least one thread that is helically wound, braided, knitted, or woven.

12. The device according to claim 3 wherein;
the tubular sheath is not adhered to the covered fiber segments.

13. The device according to claim 11 wherein;
the tubular sheath is not adhered to the covered fiber segments.

14. The device according to claim 2 wherein;
the stress members are disposed in groups that are spaced apart from one another.

15. A pressure sensitive device comprising;
a series of measurement optical fiber segments and a series of stress fiber segments extending transversely to a longitudinal direction of the measurement optical fiber segments, the stress fiber segments being disposed in an alternating manner on opposite sides of the measurement optical fiber segments, wherein each of the fiber segments in at least one of the series are covered by a protective sheath which is not adhered to the covered fiber segments, the sheath preventing the measurement fiber segments and the stress fiber segments from directly contacting each other.

16. A pressure-sensitive device comprising;
a series of measurement optical fiber segments in a series of stress members extending transversely to a longitudinal direction of the measurement optical fiber segments, the stress members being disposed in an alternating manner on opposite sides of the measurement optical fiber segments, wherein the measurement optical fiber segments are covered by a protective sheath not adhered to the covered fiber segments, the sheath preventing the measurement fiber segments and the stress members from directly contacting each other.

17. A device according to claim 15 wherein;
the protective member is tubular sheath concentric with the covered fiber segments and constituted by at least one thread that is helically wound, braided, knitted, or woven.

18. A device according to claim 16 wherein;
the protective member is a tubular sheath concentric with the covered fiber segments and constituted by at least one thread that is helically wound, braided, knitted, or woven.

19. A pressure-sensitive device according to claim 17 wherein;
the fiber segments are made of methacrylate covered silica and the sheath is made of a thread of material that is softer than the fiber.

20. A pressure-sensitive device according to claim 18 wherein;
the fiber segments are made of methacrylate covered silica and the sheath is made of a thread of material that is softer than the fiber.

21. A pressure-sensitive device according to claim 17 wherein;
the sheath is made with a thread of the diameter this is small relative to the diameter of the fibers it covers.

22. A pressure-sensitive device according to claim 18 wherein;
the sheath is made with a thread of the diameter this is small relative to the diameter of the fibers it covers.

23. A pressure-sensitive device according to claim 18 wherein;
the measurement optical fiber is made of silica and the stress fiber is made of a synthetic material.

24. A pressure-sensitive device according to claim 15 wherein;
the stress fiber segments are disposed in groups that are spaced apart from one another.

25. A pressure-sensitive device according to claim 16 wherein;
the stress members are disposed in groups that are spaced apart from one another.

26. A pressure-sensitive device according to claim 15 wherein;

the series of fiber segments are maintained in a predetermined relative position by a backing cloth.

27. A pressure sensitive device according to claim 26 wherein;

the backing cloth comprises fibers extending in a layer between the stress fibers.

28. The pressure sensitive device according to claim 15, further comprising;

top and bottom layers of resilient material sandwiching the pressure-sensitive device, and a flexible metal sheet disposed above the top layer of resilient material.

* * * * *